Aug. 9, 1966  K. MILNE ET AL  3,266,038
RADAR SYSTEMS
Filed Feb. 13, 1964  3 Sheets-Sheet 2
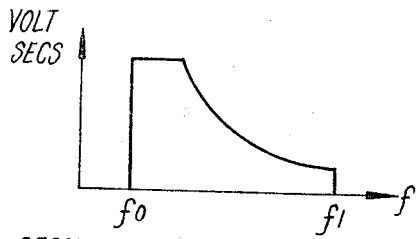
Fig.2(a) AMPLITUDE OF TRANSMITTED SPECTRUM.
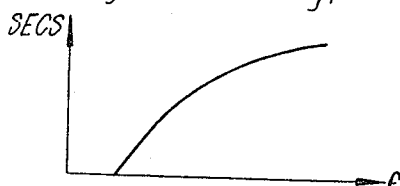
Fig.2(b) DELAY OF TRANSMITTED SPECTRUM.
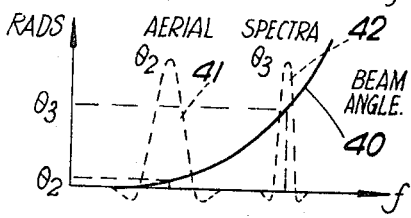
Fig.2(c) AERIAL BEAM ANGLE.
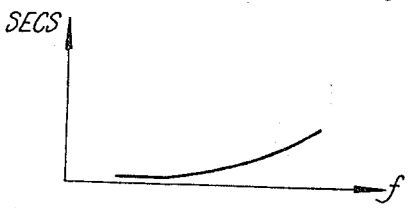
Fig.2(d) AERIAL DELAY.
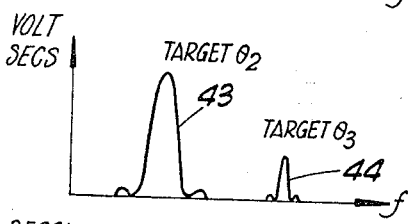
Fig.2(e) AMPLITUDE OF RECEIVED SPECTRA.
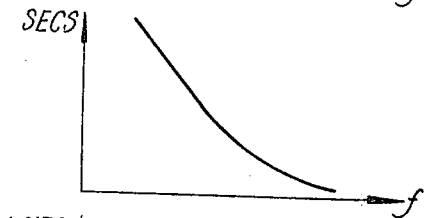
Fig.2(f) EQUALISER DELAY.
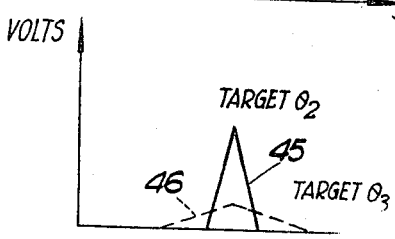
Fig.2(g) OUTPUT PULSE SHAPE.

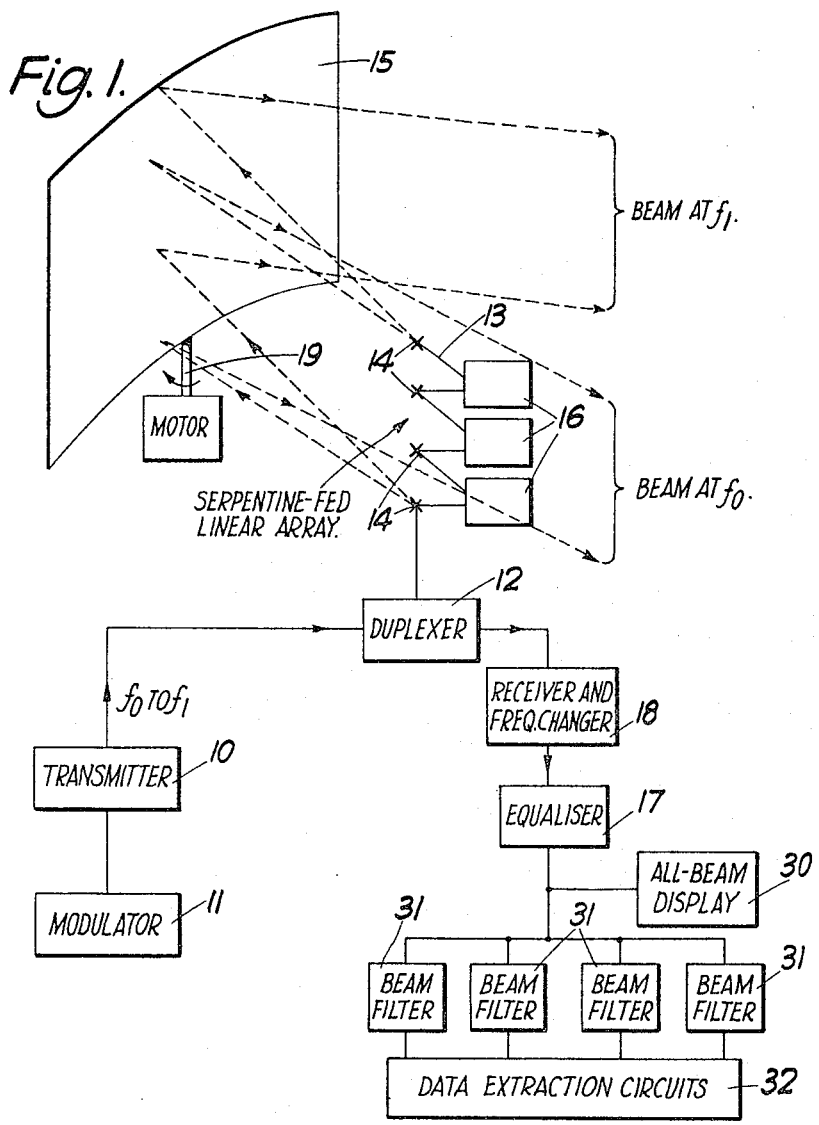
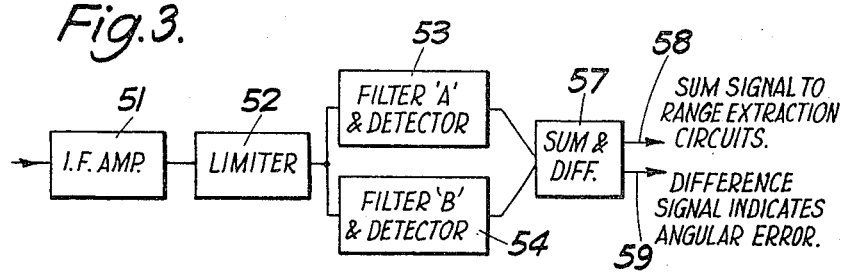

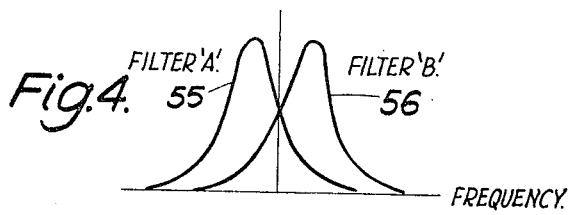
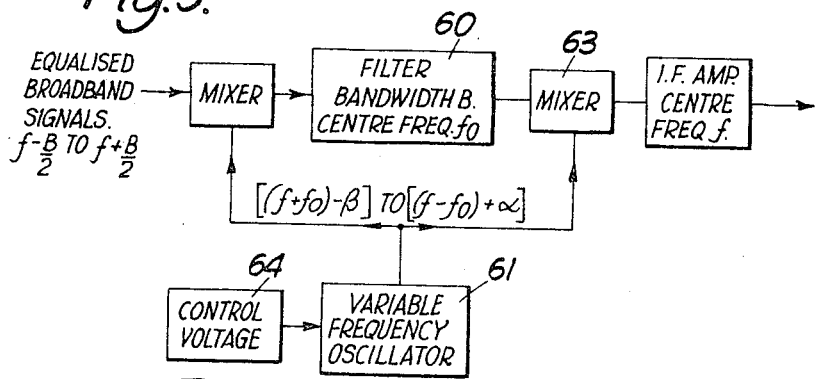
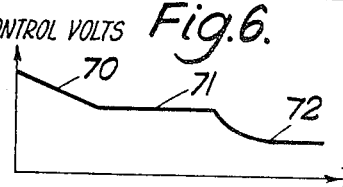
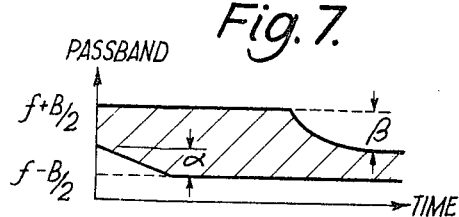
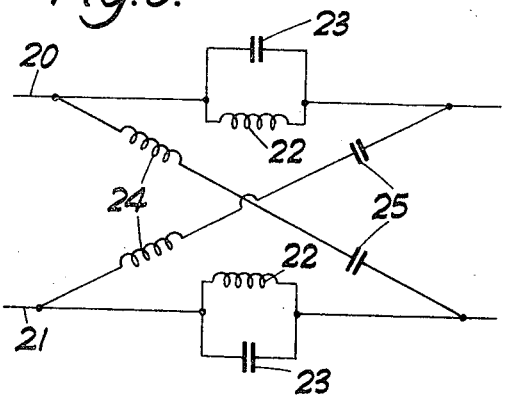

United States Patent Office 3,266,038
Patented August 9, 1966

3,266,038
RADAR SYSTEMS
Kenneth Milne and John Graham Flounders, London, England, assignors to Decca Limited, London, England, a British company
Filed Feb. 13, 1964, Ser. No. 344,781
20 Claims. (Cl. 343—17.2)

This invention relates to radar systems and, according to the invention, a radar system comprises a transmitter feeding a directional aerial, the transmitter producing pulses of radio frequency energy, the radio frequency of which varies monotonically during each pulse and the aerial being such that the direction of the radiated beam depends on the frequency of the signal and changes through at least several beamwidths during each pulse, and a receiver including an equalizer having a delay substantially matching the total transmitter and aerial delay at all radiated frequencies so that all the radiated frequencies arrive simultaneously at the output of the equaliser.

It is known to effect scanning of a directional beam by using an aerial system in which the direction of the beam depends on the radiated frequency and to radiate a frequency modulated signal so that the beam direction is scanned in accordance with the modulation of the frequency. It is also known to effect high range resolution with a frequency-insensitive aerial by transmitting a linearly frequency-modulated pulse and employing an equalising network on reception which has a linear delay versus frequency characteristic which compresses the duration of the received pulse. This is known as "pulse compression." In the arrangement of the present invention these two effects are combined. The frequency is varied not necessarily linearly, during a pulse period which may typically be rather longer than is commonly employed in high definition radar apparatus and might perhaps be of the order of 30 to 80 microseconds. The variation in frequency however causes the beam to scan during the pulse period and the duration of the response from any target will depend on the polar diagram of the aerial beam as it scans across the target. The scanning of a beam across a target however would produce a series of received echo signals from the target corresponding to the times at which the various side lobes and the main lobe of the directional beam scan across the target. In the arrangement of the present invention however the receiver includes an equaliser having a delay substantially matching the total transmitter and aerial delay at all radiated frequencies so that all the responses from a given target will arrive simultaneously at the output of the receiver. Thus one target will give substantially a single response; the frequency of the received signal is a measure of the angular position of the target and the time of reception of the signal may be used in the usual way as a measure of the range of the target.

The arrangement of the present invention finds particular application in a three dimensional scanning radar system and for this purpose, conveniently the aerial system is arranged so that, by changing the frequency, the aerial beam is scanned in a vertical plane and the whole aerial system is rotated so that successive pulses are radiated at slightly different bearings in succession to give either a scan in azimuth over a limited sector or, more generally, a repetitive scan over a complete cycle of rotation. With this three dimensional scanning arrangement, plan position information can be obtained and also, by measuring the frequency of the response from any given target, the angular elevation of that target can be determined. Thus a single radar system can give three dimensional information at a high data rate. The advantages of this arrangement can best be seen by considering a specific problem. The pulse energy required to detect a 1 square metre target at 200 miles with a 1° x 1° beam is about 120 joules (for an isolated pulse). The maximum value of rain echo obtained with this beamwidth at S-band in precipitation of 4 m.m./hour is about 10 square metres for every microsecond of pulse length. Thus, even allowing for the rain cancellation obtained by using circular polarisation, a pulse only a fraction of a microsecond long is required if the target is not to be obscured. The necessary peak power for a single-frequency radar is thus several hundreds or thousands of megawatts, which is outside the range of current transmitters. The requirement for a high data rate implies that all elevation positions be examined on every pulse. This is achieved by the above described arrangement the operation of which may be explained as follows. It will be assumed that the same aerial is used both for radiation of the transmitted signal and for reception of the echoes from distant targets by means of a suitable duplexer. Received signals are first passed through the equaliser which, for a radar using a common aerial for transmitting and receiving, is an all-pass filter network whose delay matches the sum of the two-way aerial delay and the transmitter delay at all frequencies. Thus all frequencies arrive simultaneously at the output of the equaliser. Now the principal frequency components which are received from a given elevation angle are those lying within one beamwidth of the aerial and it may be shown that these components occupy a bandwidth of approximately $1/D$ where $D$ is the aerial delay. The aerial system may typically comprise a series of radiating slots or radiating apertures fed from directional couplers spaced along a serpentine form waveguide so that the path length of the transmission path along the waveguide is substantially greater than the physical distance between the radiators thereby forming an aerial array in which there is a considerable variation in the angular direction of the beam with change of frequency. This serpentine waveguide may be arranged vertically so that the change of frequency gives a scan in elevation; the waveguide is mounted at the focus of a parabolic reflecting cylinder having its axis vertical and the whole reflecting cylinder and waveguide assembly may be rotated to give the required azimuth scan. Alternatively, a number of such serpentine-fed waveguide arrays may be stacked side by side and fed from a common transmission line via a number of phase shifters which may be electrically controlled; in this arrangement, change of frequency produces an elevation scan whilst change of phase produces an azimuth scan.

All the output signals from the equaliser may be fed together to a display which will then display responses from targets over the whole angular range covered by the scanning due to the change in frequency of the transmitted signal. In a plan position radar in which the aerial system is continuously rotated to give a beam which is scanned rapidly in elevation and slowly scanned in azimuth, it may be required to give indications of information received from different elevations and this may be done by filtering off the appropriate part or parts of the received frequency band. In this case the final spectrum is affected by the filter and the time side lobe level will depend upon both the response of the filter and the exact location of the signal spectrum within the pass band of the filter. A series of separate filters may be provided for feeding separate indicators showing information at different angles of elevation.

It will be seen that, in the above described radar apparatus using rapid scanning in the vertical plane and slower scanning in the horizontal plane, the frequency is synonymous with elevation angle. Since frequency is a measure of elevation a number of different receiver techniques can be employed with this type of radar apparatus. For example, the equivalent of static split (that is to say the provision of information in two separate channels corresponding to different elevations which overlap) may be obtained by the use of two separate frequency filters and detectors to which are fed the received radar signals after frequency changing to an intermediate frequency and amplification in an intermediate frequency amplifier and limiting in an amplitude limiter. The two filter and detector units are tuned to different frequencies and thus pass signals from targets at different angles of elevation. The detected outputs from these two filters correspond to signals from two beams at different elevations and the pass bands are chosen so that these effective beams overlap. The cross-over frequency of the two filters may be tunable to any chosen elevation. The two outputs are fed to sum and difference circuits. The sum output may be used to obtain the range information in the normal way. The difference signal will be zero at a particular angle of elevation where the two effective overlapping beams give signals of equal amplitude and hence the difference output is a measure of the angular error, that is to say the difference between the actual elevation of the target and this predetermined elevation where the effective beams are of equal amplitude. As another example short range blanking at low elevations for removal of ground clutter may be obtained by the use of a variable frequency filter. A variable frequency filter may also be used for long range blanking at high elevations to minimise the noise fed to a display showing targets from all elevations. The effect of a variable frequency filter may be obtained by using a fixed frequency band pass filter and changing the frequency of the input signals by mixing them with the output from a variable frequency oscillator. The variable frequency oscillator may be controlled by a control signal varying with time (i.e. varying with radar range) and, to give the elimination of ground clutter at close ranges and the reduction of noise at long ranges, assuming the highest frequency corresponds to maximum elevation of the beam, the control voltage is varied with time so that, for short range signals, the oscillator frequency is at its maximum to cut-off the lower part of the pass band. The frequency of the oscillator is then gradually reduced to reduce the cut-off as range increases. Beyond the expected limits of ground clutter, the frequency of the oscillator can be maintained constant to pass signals of the whole band so that all targets are detected.

A variable frequency, variable band width filter may also be used to obtain height layer information, i.e. to obtain responses only from those targets flying within predetermined altitude limits. To accomplish this, both the centre frequency and bandwidth of the filter could be controlled as a function of time and hence of range so as to accept signals from those elevations corresponding to the chosen height layer.

In the following description, reference will be made to the accompanying drawings, in which:

FIGURE 1 is a diagram illustrating a radar system;

FIGURES 2(a) to 2(g) are graphical explanatory diagrams;

FIGURE 3 is a block diagram illustrating part of one form of display apparatus;

FIGURE 4 is a graphical diagram illustrating the frequency response characteristic of two filters used in the apparatus of FIGURE 3;

FIGURE 5 is a block diagram illustrating a form of variable frequency filter;

FIGURES 6 and 7 are graphical diagrams for explaining the operation of the filter of FIGURE 5; and FIGURE 8 is a diagram illustrating the equivalent circuit of a delay equalizer used in the system of FIGURE 1.

Referring to FIGURE 1, which is a diagrammatic representation of one form of radar system according to the present invention, there is shown a transmitter 10 which produces pulses of microwave radio energy modulated by a modulator 11 so that, during each pulse the frequency from the transmitter varies monotonically between limits $f_0$ and $f_1$. The extent of the frequency change and the duration of the pulse is determined in a manner which will be discussed in more detail later but, typically a non-linear frequency modulation is employed with a pulse duration of the order of 30 to 80 microseconds and a transmission deviation of the order of 20 to 200 mc./s. The output from the transmitter 10 is fed through a duplexer 12 to a serpentine feed guide 13 feeding an array of linear radiators 14 which direct the radiation into a cylindrical parabolic reflector 15. The radiating element 14 in the simplest form may consist of a linearly arranged set of apertures in a wiveguide of serpentine form so that the physical spacing between the successive apertures is very much less than the length of the waveguide forming the transmission path between them. It is well known that, by using this form of linear array with a serpentine feed, it is possible to get a beam which is directional in one plane but the direction of which depends on the frequency of the signals fed to the array. For reasons which will be discussed later, however, it is preferred in the radar system of the present invention to include dispersive elements 16 in the serpentine feed guide between each pair of successive radiating elements in a manner which is described in more detail in the specification of copending application No. 344,667. These dispersive elements give a delay which is dependent on frequency and so enable the relationship between the direction of the beam and frequency to be designed as required. In the radar apparatus of FIGURE 1, the radiating elements 14 are arranged in a vertical line to give beaming in the vertical plane and thus the elevation angle of the beam depends upon the transmitter frequency. By appropriately shaping the transmitter frequency spectrum, the power density can be controlled at all elevations to obtain a desired coverage pattern. The reflector 15 forms the horizontal beam and the whole aerial system is mechanically rotated, as indicated diagrammatically at 19, so that the beam is scanned mechanically in the horizontal plane; it would normally be continuously rotated in that plane. Received signals picked up by the aerial system pass through the duplexer 12 to an equalizer 17 which is in all-pass filter network whose delay matches the sum of the two way aerial delay and the transmitter delay at all frequencies. The equalizer 17 may be arranged to operate at an intermediate frequency as shown in FIGURE 1 where the output from the duplexer 12 is fed to a receiver and frequency changer 18 before passing to the equalizer 17. The equalizer ensures that all frequencies arrive simultaneously at the output of the equalizer. The design of such equalizer can be explained by reference to the equivalent lumped circuit elements in a two line transmission system. FIGURE 8 shows a section of a delay equalizer in a two line transmission system having, in each of the two lines 20 and 21, a parallel tuned circuit comprising an inductance 22 and a capacitance 23 and having, between the input end of line 20 and the output end of line 21 and between the input end of line 21 and the output end of line 20, series tuned circuits each comprising an inductance 24 and a capacitance 25. In the simplest arrangement, the magnitude of each of the inductances 22 is $L_1/2$, the magnitude of each of the capacitances 23 is $2C_1$, the magnitude of each of the inductances 24 is $2L_2$ and the magnitude of each of the capacitances 25 is $C_2/2$. The tuned circuits are made to have the same resonant frequency $F_0$ so that $$F_0 = \frac{1}{2\pi}\sqrt{L_1 C_1} = \frac{1}{2\pi}\sqrt{L_2 C_2}$$

It may be shown that such a network remains substantially matched as the frequency varies but the time delay varies with frequency in a manner which can be controlled by choice of the parameters of the circuit. The delay equalizer 17 of FIGURE 1 may use a number of such circuits in cascade or, alternatively, depending on the choice of the intermediate frequency, may, for example, use a microwave analogue of the form of equalizer shown in FIGURE 8. The output from the equalizer is fed, in the arrangement of FIGURE 1, to an "all-beam" display 30 which displays all the received radar responses. This display may be a cathode ray tube plan position indicator display of conventional type displaying the target echoes in plan position. Alternatively or additionally the information may be processed in a computer.

The variation in frequency of the transmitter causes the aerial beam to scan in elevation during the pulse period and the duration of the response from any target will depend on the polar diagram of the aerial beam as it scans across the target. The scanning of a beam across a target would produce a series of received echoes from the target corresponding to the times at which the various side lobes and the main lobe of the beam scan across the target. The use of the equalizer 17 having a delay matching the total transmitter aerial delay for all radiated frequencies ensures that all responses, however, arrives simultaneously at the output of the equalizer. Thus one target will give substantially a single response. The frequency of the received signals is a measure of the angular elevation of the target and the time of reception of the signal may be used in the usual way as a measure of the range of the target. The principal frequency components which are received from a given elevation angle are those lying within one beam width of the aerial and it may be shown that these components occupy a bandwidth of approximately $1/D$ where $D$ is the aerial delay. In a serpentine form waveguide aerial, the aerial delay $D$ may be defined as total delay along the serpentine feed. Since the phase centre of the radiating waveguide is close to its physical centre, the two-way delay for echoes is approximately equal to this one-way delay over the total feed length. Thus the minimum pulse length which can be obtained just equals the aerial delay $D$ and this property is practically independent of the form of the transmitted spectrum.

If the amplitude of the transmitted spectrum is reasonably constant over a frequency range corresponding to three or four aerial beamwidths, the shape of the received spectrum is principally determined by the aerial; specifically, it is the square of the aerial's spectrum at the angle of interest. The shape of the output pulse is then given by the convolution or "auto-correlation" of the aerial's aperture illumination. For example, with a uniformly-illuminated aerial the output pulse will be triangular. The output pulse fed to the all-beam display will ideally be free from time "side-lobes," but in practice unavoidable ripples may appear in the transmitter spectrum and these will give rise to small time side-lobes.

Angular resolution depends upon the aerial beamwidth and range resolution depends upon the aerial group delay $D$. The transmitter spectrum is shaped to give the required coverage and a bandwidth of $1/D$ is required for each beamwidth of coverage. Considerations of target length set a minimum value of $D$ at around 0.1 microseconds (smaller values need wider transmission bandwidths but cannot yield finer range resolution due to the finite size of the target), whilst considerations of clutter returns set a maximum value of $D$ at perhaps 0.1 microseconds again for long ranges and low elevations, rising to several microseconds at higher elevations.

Referring to FIGURE 2 the graphical diagram $(a)$ shows a typical example of the required amplitude of the transmitted spectrum (the integral of the signal amplitude with respect to time) plotted against frequency. The amplitude has to be greater at lower elevations, where long range targets are to be detected. Since with present day transmitter techniques it is convenient to use constant power pulse, a non-linear frequency modulation has to be employed, the waveform of which is determined in accordance with the sum of the aerial delay and equaliser delay characteristics to give the required transmitted spectrum. The diagram $(b)$ shows the relationship between the delay of the transmitted spectrum and frequency. It has been borne in mind that although it is relatively easy to visualise the concept of transmitter delay when the transmitter frequency is changing with time, the actual radiation from the transmitter necessarily comprises a spectrum of frequencies and thus there is in effect a delay spectrum. Considering the simple case of a constant amplitude pulse with linear frequency modulation, it may be shown that if the pulse is of length $T$ the transmitter voltage may be expressed as a function $u(t)$ of time $t$ as follows:

$$u(t) = \cos 2\pi(f_0 t + \tfrac{1}{2} a t^2) \text{ where } 0 < t < T$$

and where $a$ is the rate of change of frequency with time. If ($aT$) is much greater than $1/T$, that is, if the total frequency change is much greater than the reciprocal of the pulse length, the spectrum is substantially constant from $f = f_0$ to $f = (f_0 + aT)$ being approximately 6db down at edges of the band. The amplitude is approximately $1/\sqrt{a}$ that is the amplitude is inversely proportional to the square root of the rate of change of frequency. Thus the delay spectrum is $$\tau(f) \doteq \frac{f_0 - f}{a}$$

which is simply the time taken for the instantaneous transmitter frequency to increase to $f$. In the more general case, with an arbitrary frequency modulation, the calculation is more complex but the delay spectrum can be computed and hence the modulation waveform may be determined to suit the sum of the aerial and equaliser delays.

FIGURE 2($c$) shows by the solid line 40 the aerial beam angle plotted against frequency and the dash lines 41, 42 show the aerial spectra at elevations $\theta_2$ and $\theta_3$ respectively. FIGURE 2($d$) shows the aerial delay plotted against frequency. The aerial delay characteristic has to be chosen as one that is physically realisable and which has the required delay (0.1 microseconds in a previously quoted example) at low elevations with some increase in delay at higher elevations. One form of construction of an S-band aerial with dispersive elements in a serpentine feed suitable for this purpose is described and illustrated in the aforementioned co-pending application No. 344,667. FIGURE 2($e$) shows, by curves 43 and 44 respectively the amplitude of the received spectra for targets at elevation $\theta_2$ and $\theta_3$ plotted against frequency. FIGURE 2($f$) shows the equalizer delay plotted against frequency. The equalizer delay characteristic has to be chosen as one that is physically realisable and which has the requisite slope at frequencies corresponding to low elevations and a reduced slope at frequencies corresponding to higher elevations. However the received signals can be changed to an intermediate frequency before being fed to the equalizer and hence the centre frequency of the equalizer can be varied by suitable choice of the intermediate frequency. Moreover, fixed delays can be tolerated in the equaliser (unlike the aerial); hence there is more freedom in the design of the equalizer than of the aerial delay network. FIGURE 2($g$) shows the output pulse shape plotted against time for targets at elevations $\theta_2$ and $\theta_3$ as the solid line 45 and the dashed line 46 respectively.

Since frequency is a measure of elevation, a number of different receiver techniques can be employed with this type of radar apparatus. The equivalent of static split, that is to say the provision of information in two separate channels corresponding to different elevations which overlap, may be obtained by the use of two separate frequency filters and detectors, for example, as shown in FIGURE 3. The received radar signals from the equalizer 17, at the intermediate frequency, are amplified in an intermediate frequency amplifier 51 and limited in an amplitude limiter 52 and then fed to two filters and detector units 53 and 54 respectively. The two filter and detector units 53 and 54 are tuned to different frequencies in the manner shown in FIGURE 4 where the curves 55, 56 represent the amplitude characteristics plotted against frequency of the two units 53 and 54 respectively. It will be noted that the two characteristics overlap. The two filter and detector units pass signals of different frequencies and thus pass signals from targets at different angles of elevation. The detected outputs from these two filters correspond to signals from two beams at different elevations and, by arranging the filter characteristics as shown in FIGURE 4, the filters give the effect of two overlapping beams. The cross-over frequency of the two filters may be tunable to correspond to any chosen elevation. The outputs from the two filter and detector units 53 and 54 are combined in a sum and difference combining unit 57 to give a sum signal output on lead 58 and a difference signal output on a lead 59. The sum output may be used to obtain range information in the normal way. The difference signal will be zero at the angle of elevation where the two effective overlapping beams gives signals of equal amplitude. Hence the difference output is a measure of the angular error from this particular angle of elevation. The output signals on these leads 58 and 59 may be utilised in any required manner, for example, they may be displayed for visual indication or processed in a computer.

As another example of the use of the signals from the radar apparatus of FIGURE 1, short range blanking at lower elevations for the removal of ground clutter may be obtained by using a variable frequency filter. A variable frequency filter may also be used for long range blanking at high elevations to minimize the noise fed to a display showing targets from all elevations. FIGURE 5 illustrates a form of variable frequency filter such as may be used for this purpose and which employs a fixed frequency band pass filter, the frequency of the input signals being changed by mixing them with the output from a variable frequency oscillator so that the overall effect is that of a variable frequency filter. In the example shown in FIGURE 5 it is assumed that the equalized incoming signals might be in the band from $f-B/2$ to $f+B/2$ where B is the width of the band and $f$ the mean frequency. In this example it will be assumed that the highest frequency corresponds to the maximum elevation of the beam. A filter 60 is employed having a bandwidth B and a centre frequency $f_0$. A variable frequency oscillator 61 has an output frequency variable between $f-f_0-\beta$ and $f-f_0+\alpha$ and the output from the oscillator 61 is used as a heterodyne signal for changing the frequency of the incoming signals before they pass into the filter and after leaving the filter in frequency changes 62 and 63. It will be seen that, for the highest frequency of the oscillator output, only incoming signals of frequencies between $f-B/2+\alpha$ and $f+B/2$ will be passed whilst, for the lowest oscillator frequency only signals between $f-B/2$ and $f+B/2-\beta$ will be passed. The variable frequency oscillator may be controlled by a control signal varying with time, that is to say varying with radar range from a control voltage generator 64. FIGURE 6 is a graphical diagram showing how the amplitude of such a control voltage from generator 64 applied to the variable frequency oscillator varies with time and FIGURE 7 illustrates, by the hatched area, how the pass band frequency correspondingly varies with time. Elimination of ground clutter is effected by operating the oscillator at its highest frequency. Ground clutter generally decreases with range and the control voltage is therefore gradually reduced as indicated by the sloping portion 70 of the graph in FIGURE 6. It will be seen that for short range signals the oscillator frequency is at its maximum so effectively cutting off the lower part of the pass-band as shown in FIGURE 7. The gradual reduction in the frequency of the oscillator reduces the cut-off as range increases. Beyond the expected limits of ground clutter the oscillator frequency is maintained constant at $f-f_0$ so as to pass signals of the whole band $f-B/2$ to $f+B/2$. This is indicated by the horizontal portion 71 of the graph in FIGURE 6. At longer ranges the high elevation signals are cut off by reducing the oscillator frequency still further to the value $f-f_0-\beta$ which may be maintained for a period corresponding to the region where the high elevation beams may be cut off. This is indicated by the curved portion 72 of FIGURE 6. It will be appreciated that for aircraft, the maximum possible height of flight results in the absence of any possibility of echo returns from aircraft on the high elevation beams at long ranges. Thus the reduction of the pass band for longer ranges results in a reduction of noise whilst still leaving echo returns from the elevations of interest. Referring to FIGURE 5 the output from the filter 60 after frequency changing in the frequency changer 63 has a pass band centred at $f$ and is amplified in intermediate frequency amplifier stage 65 having a frequency centred at this frequency $f$ to give an output which can be fed to display and data extraction circuits.

A variable frequency, variable bandwidth filter may also be used to obtain height layer information, that is to obtain responses only from those targets lying within predetermined altitude limits. To accomplish this, both the centre frequency and the bandwidth of the filter could be controlled as a function of time and hence of range so as to accept signals from those elevations corresponding to the chosen height layer.

Referring to FIGURE 1 there are illustrated a number of beam filters 31 which may be of the types described for example with reference to FIGURES 3 and 5 and which feed information into data extraction circuits 32.

It will be appreciated that a wide variety of different modulations of the transmitter output are theoretically possible provided the equalizer is arranged to give the appropriate variations of delay with frequency. The transmitter modulation characteristic may have both a frequency variation and an amplitude variation with time during the pulse transmission period. Using present day transmitter techniques however the most convenient arrangement is to employ frequency modulation of the transmitter output during an approximately constant power pulse. The power radiated over a given angular range may be assumed to be proportional to the time which the instantaneous transmitter frequency spends in the corresponding frequency range. The required coverage diagram then determines the frequency versus time characteristic. The actual spectrum is the Fourier Transform of the transmitted waveform and will contain minor ripples. The equalizer 17 may be used to reduce or possibly eliminate these ripples in addition to equalizing the delays. However, it is convenient also to use the aerial group delay characteristic to give further shaping and to reduce the bandwidth demand upon the transmitter. This is achieved by using the dispersive elements 16 to form a dispersive aerial system of the kind described in the co-pending application No. 344,667. In such an aerial system the transmission line between the radiating elements 14 is dispersive so that the transmission delay through the line between the successive radiating points varies with frequency. With a non-dispersive aerial, the aerial delay is constant for all elevations and in a typical case might be 0.1 microsecond for all elevations so that the rate of change of beam angle with frequency is constant at about one tenth of a beamwidth per mc./s. The required transmitted pulse length per beam position may be obtained by treating the problem as a single frequency radar problem. The minimum pulse length per beamwidth may decrease with elevation angle and thus for a minimum power system using a non-dispersive aerial, the frequency modulation of the transmitter would have to have a slope which increased with elevation over quite a wide range. This would necessitate a wide bandwidth, which for a typical S-band radar with a maximum range of 200 nautical miles and covering 0°–20° of elevation with a 1° beamwidth and an aerial delay of 0.1 microsecond might be of the order of 200 megacycles per second, this being the integral of the reciprocal of the aerial delay. Integration of the transmitted pulse length per beamwidth yields the total pulse length and hence the mean power required. The bandwidth and power requirements may be very substantially reduced by using a dispersive aerial giving an increased delay at higher elevations and by matching the transmitter characteristics and the aerial characteristics. A wide variety of combinations of transmitter modulations and aerial delay characteristics can thus be used to achieve a specified overall coverage. In an extreme case the aerial delay might be arranged to vary with frequency from 0.1 microsecond at zero elevation to 30 microseconds at 20° elevation so as to give an extremely non-linear relationship between frequency and elevation. The increased aerial delay at higher elevation reduces the bandwidth requirements which might now be of the order of 20 mc./s. for this particular example. The frequency modulation of the transmitter would then have a slope which decreased with elevation in contrast to the increasing slope required with the non-dispersive aerial. In practice the design would be a compromise between the physically realizable aerial delay characteristic for a dispersive aerial, the equalizer delay characteristic such as is physically realizable and the shaping of the frequency modulation of the transmitter.

It may be, in some cases, convenient to use more than one transmitter; for example a first transmitter may feed a low delay aerial to cover elevations of say 0 degree to 5 degrees and a second transmitter, conveniently in a slightly different frequency band, may feed a higher delay aerial to cover elevations above 5 degrees. With such an arrangement it may be possible to use linear frequency modulation for both transmitters and linear delay equalizers.

In the above examples it has been assumed that the transmitter frequency increases with time, the beam angle increases with frequency and the aerial delay increases with frequency. Any of these quantities can be reversed by suitable design. Furthermore the sense of the characteristic of the delay equalizer can be reversed by operation of the local oscillator of a frequency changer either above or below the transmitter frequency.

In determining the radar parameters, the length of the target is the starting point since, for the pulse compression to be effective, the echoes must be correlated over all frequencies received from the target. Considerations of the target size of present day aircraft set a practical minimum limit of about 0.1 microseconds for the compressed pulse length since smaller values will need wider transmission bandwidths but cannot yield finer range resolution. The beamwidth must then be chosen sufficiently small to give adequate ratio of target echo to rain echo with the selected compressed pulse length. The mean power of the transmitter must then be chosen to give an adequate signal to noise ratio at long range. High peak powers are advantageous in minimizing the total pulse length and hence the total delay and number of sections required in the equalizer.

It will be seen that the above described technique enables a high data rate three-dimensional radar system to be designed which can be made virtually free from precipitation clutter effects and which in its simplest form requires only one transmitter and only one aerial feeder. Elevation information is obtained from the frequency of the echo and a variety of receiver techniques can be employed to perform such functions as static split which have hitherto required expensive microwave systems. All elevation positions over the operating range are examined within each pulse and the data rate can be as high as the azimuth beamwidth and pulse repetition frequency will permit. It will be noted moreover that a single aerial design can be used for a wide variety of coverage patterns since only the delay equaliser and the frequency modulation of the transmitter need be changed.

We claim:

1. A radar system comprising a transmitter feeding a directional aerial, the transmitter producing pulses of radio frequency energy the frequency of which varies monotonically during each pulse, and the aerial being such that the direction of the radiated beam depends on the frequency of the signal and changes through at least several beam widths during each pulse, and a receiver including an equaliser having a delay substantially matching the total transmitter and aerial delay at all radiated frequencies so that all the radiated frequencies arrive simultaneously at the output of the equalizer.

2. A radar system as claimed in claim 1 and wherein the aerial system is arranged so that, by changing the frequency, the aerial beam is scanned in a vertical plane and wherein the whole aerial system is rotated so that successive pulses are radiated at slightly different bearings in succession to give a scan in azimuth.

3. A radar system as claimed in claim 1 wherein the aerial system comprises a serpentine feed guide feeding a linear array of radiating elements directing radiation into a reflector.

4. A radar system as claimed in claim 3 and having a dispersive element in said feed guide between successive radiating elements.

5. A radar system as claimed in claim 3 wherein all the received signals from the equaliser are fed together to a display.

6. A radar system comprising a transmitter feeding a directional aerial, the transmitter producing pulses of radio frequency energy the frequency of which varies monotonically during each pulse, the aerial being such that the direction of the radiated beam depends on the frequency of the signal and changes through at least several beam widths during each pulse, and a receiver including an equalizer having a delay substantially matching the total transmitted and aerial delay at all radiated frequencies so that all the radiated frequencies arrive simultaneously at the output of the equalizer and including filtering means for filtering off from the output of the equalizer a part or parts of the received frequency band.

7. A radar system as claimed in claim 6 wherein said filtering means comprise a series of separate filters for feeding separate indicators.

8. A radar system as claimed in claim 6 wherein said filtering means comprise two separate frequency filters and detectors tuned to different frequencies coresponding to signals from partially overlapping beams and wherein means are provided for combining the outputs from said separate filters and detectors to produce sum and difference signals.

9. A radar system as claimed in claim 6 wherein said filtering means comprise a filter with a time-varied frequency pass band.

10. A radar system as claimed in claim 9 and in which the aerial beam is scanned in a vertical plane by the varying frequency, wherein the said filter with a time-varied frequency pass band is arranged to give short range blanking at low elevations to remove ground clutter.

11. A radar system as claimed in claim 9 and in which the aerial beam is scanned in a vertical plane by the varying frequency, wherein the said filter with a time-varied frequency pass band is arranged to give long range blanking at high elevations.

12. A radar system as claimed in claim 9 wherein said filter with a time-varied frequency pass-band comprises a filter with a fixed frequency pass-band, a variable frequency oscillator and a heterodyne mixer to combine incoming signals with the output of the oscillator and to feed the combined signals to said filter with a fixed frequency pass-band.

13. A radar system as claimed in claim 12 wherein a second mixer is provided to combine the output of said filter with the output of the oscillator to bring the signals passed by the filter back to their original frequencies.

14. A radar system as claimed in claim 6 wherein said transmitter is arranged to radiate constant power pulses modulated with a non-linear frequency modulation.

15. A radar system comprising a transmitter feeding a directional aerial, the transmitter producing pulses of radio frequency energy the frequency of which varies monotonically during each pulse, aerial being such that the direction of the radiated beam depends on the frequency of the signal and changes through at least several beam widths during each pulse, a duplexer arranged so that the same aerial may be used both for radiation of the transmitted signal and for reception of echoes from distant targets, and a receiver including an equalizer having a delay substantially matching the total transmitter and aerial delay at all radiated frequencies so that all radiated frequencies arrive simultaneously at the output of the equalized.

16. A radar system comprising a transmitter feeding a directional aerial, the transmitter producing pulses of radio frequency energy the frequency of which varies monotonically during each pulse, the aerial being such that the direction of the radiated beam depends on the frequency of the signal and changes through at least several beam widths during each pulse, and a receiver including a frequency changer to convert the received signals to an intermediate frequency, and an equalizer having a delay substantially matching the total transmitter and aerial delay at all the radiated frequencies so that all the radiated frequencies arrive simultaneously at the output of the equalizer.

17. A radar system comprising a transmitter feeding a directional aerial, the transmitter producing pulses of radio frequency energy the frequency of which varies monotonically during each pulse, the aerial comprising a number of serpentine feed guides each feeding a linear array of radiating elements with the arrays stacked side by side, the different arrays being fed via electrically controlled phase shifters, and a receiver including an equalizer having a delay substantially matching the total transmitter and aerial delay at all radiated frequencies so that all the radiated frequencies arrive simultaneously at the output of the equalizer.

18. A radar system comprising a transmitter feeding a directional aerial, the transmitter producing constant power pulses of radio frequency energy the frequency of which is modulated with a non-linear frequency modulation and varies monotonically during each pulse, the aerial having a serpentine feed guide feeding a linear array of radiating elements directing radiation into a reflector so that the direction of the radiated beam depends on the frequency of the signal and changes through at least several beam widths during each pulse, the radiated beam being scanned in elevation by changing the frequency with the non-linear modulation having a rate of change which varies with elevation, dispersive elements located in said feed guide to give an increased delay at higher elevations, and a receiver including an equalizer having a delay substantially matching the total transmitter and aerial delay so that all the radiated frequencies arrive simultaneously at the output of the equalizer.

19. A radar system comprising a transmitter feeding a directional aerial, the transmitter producing pulses of radio frequency energy the frequency of which varies monotonically during each pulse, the aerial having a serpentine feed guide feeding a linear array of radiating elements directing radiation into a reflector so that the direction of the radiated beam depends on the frequency of the signal and changes through at least several beam widths during each pulse, the aerial system being arranged so that by changing the frequency the aerial beam is scanned in a vertical plane and being rotated so that successive pulses are radiated at slightly different bearings in succession to give a scan in azimuth, a duplexer arranged so that the same aerial may be used both for radiation of the transmitted signal and for reception of echoes from distant targets, and a receiver including an equalizer having a delay which matches the total transmitter and aerial delay at all radiated frequencies so that all radiated frequencies arrive simultaneously at the output of the equalizer and including filtering means for filtering off from the output of the equalizer a selected part or parts of the received frequency band.

20. A radar system comprising a transmitter feeding a directional aerial, the transmitter producing constant power pulses of radio frequency energy the frequency of which is modulated with non-linear frequency modulation and varies monotonically during each pulse, the aerial having a serpentine feed guide feeding a linear array of radiating elements direction radiation into a reflector so that the radiated beam is scanned in elevation by changing the frequency with the non-linear frequency modulation whose rate of change varies with elevation, the aerial system having dispersive elements giving an increased delay at higher elevations and being rotated so that successive pulses are radiated at slightly different bearings in succession to give a scan in azimuth, a duplexer arranged so that the same aerial may be used both for radiation of the transmitted signal and for reception of echoes from distant targets, and a receiver including an equalizer having a delay which matches the total transmitter and aerial delay at all radiated frequencies so that all the radiated frequencies arrive simultaneously at the output of the equalizer and including filtering means for filtering off from the output of the equalizer a selected part or parts of the received frequency band.

References Cited by the Examiner

UNITED STATES PATENTS

| | | | |
|---|---|---|---|
| 3,029,429 | 4/1962 | Rodgers | 343—16 |
| 3,099,833 | 7/1963 | Tucker et al. | 343—16 |

CHESTER L. JUSTUS, Primary Examiner.

R. E. KLEIN, R. D. BENNETT, Assistant Examiners.